United States Patent
Ajito

(10) Patent No.: US 8,947,575 B2
(45) Date of Patent: Feb. 3, 2015

(54) IMAGE PICKUP APPARATUS HAVING WARNING REGION DETECTION RELATED TO DYNAMIC RANGE EXPANSION

(75) Inventor: Takeyuki Ajito, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 223 days.

(21) Appl. No.: 13/603,560

(22) Filed: Sep. 5, 2012

(65) Prior Publication Data

US 2013/0057729 A1 Mar. 7, 2013

(30) Foreign Application Priority Data

Sep. 6, 2011 (JP) ................. 2011-193509

(51) Int. Cl.
*H04N 5/222* (2006.01)
*H04N 9/68* (2006.01)
*H04N 5/232* (2006.01)
*H04N 5/235* (2006.01)

(52) U.S. Cl.
CPC ......... *H04N 5/23293* (2013.01); *H04N 5/2355* (2013.01)
USPC ...................... 348/333.04; 348/234

(58) Field of Classification Search
CPC .......................... H04N 5/23293; H04N 5/2355
USPC .............. 348/222.1, 239, 234, 221.1, 333.04, 348/333.05, 333.11, 333.12
See application file for complete search history.

(56) References Cited

U.S. PATENT DOCUMENTS

2012/0105681 A1* 5/2012 Morales ........................ 348/239
2012/0148090 A1* 6/2012 Omi .............................. 382/100

FOREIGN PATENT DOCUMENTS

JP 2009-239637 10/2009

* cited by examiner

*Primary Examiner* — Mekonnen Dagnew
(74) *Attorney, Agent, or Firm* — John C. Pokotylo; Straub & Pokotylo

(57) ABSTRACT

An image pickup apparatus generates a display image signal by implementing predetermined dynamic range expansion processing on an image signal obtained by performing under-exposed image pickup, and detects an image region in which a pixel within a predetermined gradation range exists as a warning region from the image signal either prior to implementation of the predetermined dynamic range expansion processing or following implementation of the predetermined dynamic range expansion processing. The image pickup apparatus synthesizes the display image signal with a warning pattern corresponding to the warning region and displays the synthesized image as a live view image.

20 Claims, 11 Drawing Sheets

| DETERMINATION ORDER (PRIORITY LEVEL) | GRADATION RANGE | | REGION DETERMINATION RESULT | MEANING |
|---|---|---|---|---|
| | LOWER LIMIT | UPPER LIMIT | | |
| 1 | TH_O_1 | TH_O_1 | WARNING REGION 1 | BLOWN OUT HIGHLIGHTS REGION WITH DYNAMIC RANGE EXPANSION RATIO 400% ON OVER SIDE |
| 2 | TH_O_2 | TH_O_1 | WARNING REGION 2 | BLOWN OUT HIGHLIGHTS REGION WITH DYNAMIC RANGE EXPANSION RATIO 300% ON OVER SIDE |
| 3 | TH_O_3 | TH_O_1 | WARNING REGION 3 | BLOWN OUT HIGHLIGHTS REGION WITH DYNAMIC RANGE EXPANSION RATIO 200% ON OVER SIDE |
| 4 | TH_O_4 | TH_O_1 | WARNING REGION 4 | BLOWN OUT HIGHLIGHTS REGION WITH DYNAMIC RANGE EXPANSION RATIO 100% ON OVER SIDE |
| 5 | 0 | TH_A_1 | WARNING REGION 5 | BLOCKED UP SHADOWS REGION WITH DYNAMIC RANGE EXPANSION RATIO 400% ON UNDER SIDE |
| 6 | 0 | TH_A_2 | WARNING REGION 6 | BLOCKED UP SHADOWS REGION WITH DYNAMIC RANGE EXPANSION RATIO 300% ON UNDER SIDE |
| 7 | 0 | TH_A_3 | WARNING REGION 7 | BLOCKED UP SHADOWS REGION WITH DYNAMIC RANGE EXPANSION RATIO 200% ON UNDER SIDE |
| 8 | 0 | TH_A_4 | WARNING REGION 8 | BLOCKED UP SHADOWS REGION WITH DYNAMIC RANGE EXPANSION RATIO 100% ON UNDER SIDE |

FIG. 4

| GRADATION LOSS REGION MAP | SYNTHESIS RATIO | | |
|---|---|---|---|
| | WARNING PATTERN 1 | WARNING PATTERN 2 | DISPLAY IMAGE |
| WARNING REGION 1 | 100% | 0% | 0% |
| WARNING REGION 2 | 50% | 0% | 50% |
| WARNING REGION 3 | 25% | 0% | 75% |
| WARNING REGION 4 | 12% | 0% | 88% |
| WARNING REGION 5 | 0% | 100% | 0% |
| WARNING REGION 6 | 0% | 50% | 50% |
| WARNING REGION 7 | 0% | 25% | 75% |
| WARNING REGION 8 | 0% | 12% | 88% |

IMAGE PICKUP APPARATUS HAVING WARNING REGION DETECTION RELATED TO DYNAMIC RANGE EXPANSION

FIELD OF THE INVENTION

This invention relates to a technique for confirming an effect of dynamic range expansion on a live view image.

In a known conventional technique, a luminance histogram obtained during dynamic range expansion is superimposed onto a through image (through-the-lens image) by switching an exposure condition in accordance with a dynamic range expansion ratio set by a user, and thus displayed (see JP2009-239637A). As a result, the user can confirm the effect of the dynamic range expansion in real time.

In this conventional technique, the luminance histogram obtained upon expansion of the dynamic range is simply displayed in accordance with the dynamic range expansion ratio set by the user.

SUMMARY OF THE INVENTION

An image pickup apparatus of an aspect of the present invention includes an image pickup unit that converts an optical image of an object received via an imaging lens into an image signal, an exposure control unit capable of controlling an exposure time of the image pickup unit such that the object image is underexposed relative to an appropriate exposure, an image processing unit that generates a display image signal by implementing predetermined dynamic range expansion processing on an image signal obtained by performing underexposed image pickup, a warning region detection unit that detects an image region in which a pixel within a predetermined gradation range exists as a warning region from the image signal either prior to implementation of the predetermined dynamic range expansion processing or following implementation of the predetermined dynamic range expansion processing, a synthesis unit that synthesizes the display image signal generated by the image processing unit with a warning pattern corresponding to the warning region detected by the warning region detection unit, and a display unit that displays the image synthesized by the synthesis unit as a live view image.

An image pickup apparatus of another aspect of the present invention includes an image pickup unit that converts an optical image of an object received via an imaging lens into an image signal, an exposure control unit capable of controlling an exposure time of the image pickup unit such that the object image is underexposed relative to an appropriate exposure and capable of controlling the exposure time of the image pickup unit such that the object image is overexposed relative to the appropriate exposure, a synthesized image generation unit that generates a synthesized image signal by synthesizing an image signal obtained by underexposed image pickup with an image signal obtained by overexposed image pickup, an image processing unit that generates a display image signal by implementing predetermined dynamic range expansion processing on the synthesized image signal generated by the synthesized image generation unit, a warning region detection unit that detects an image region in which a pixel within a predetermined gradation range exists as a warning region from the image signal either prior to implementation of the predetermined dynamic range expansion processing or following implementation of the predetermined dynamic range expansion processing, a synthesis unit that synthesizes the display image signal generated by the image processing unit with a warning pattern corresponding to the warning region detected by the warning region detection unit, and a display unit that displays the image synthesized by the synthesis unit as a live view image.

An image pickup apparatus of yet another aspect of the present invention includes an image pickup unit that converts an optical image of an object received via an imaging lens into an image signal, an exposure control unit that controls an exposure time of the image pickup unit such that the object image is underexposed relative to an appropriate exposure, an image processing unit that generates a display image signal by implementing predetermined dynamic range expansion processing on an image signal obtained by performing underexposed image pickup, a warning region detection unit that detects an image region in which a pixel within a predetermined gradation range exists as a warning region from the image signal either prior to implementation of the predetermined dynamic range expansion processing or following implementation of the predetermined dynamic range expansion processing, a luminance histogram creation unit that creates a luminance histogram corresponding to the warning region detected by the warning region detection unit and a luminance histogram corresponding to an entire region of the display image generated by the image processing unit, a superimposing unit that superimposes the luminance histogram corresponding to the warning region and the luminance histogram corresponding to the entire region of the display image, created by the luminance histogram creation unit, onto the display image signal generated by the image processing unit, and a display unit that displays the image on which the luminance histogram corresponding to the warning region and the luminance histogram corresponding to the entire region of the display image have been superimposed by the superimposing unit as a live view image.

An image pickup apparatus of yet another aspect of the present invention includes an image pickup unit that converts an optical image of an object received via an imaging lens into an image signal, an exposure control unit capable of controlling an exposure time of the image pickup unit such that the object image is underexposed relative to an appropriate exposure and capable of controlling the exposure time of the image pickup unit such that the object image is overexposed relative to the appropriate exposure, a synthesized image generation unit that generates a synthesized image signal by synthesizing an image signal obtained by underexposed image pickup with an image signal obtained by overexposed image pickup, an image processing unit that generates a display image signal by implementing predetermined dynamic range expansion processing on the synthesized image signal generated by the synthesized image generation unit, a warning region detection unit that detects an image region in which a pixel within a predetermined gradation range exists as a warning region from the image signal either prior to implementation of the predetermined dynamic range expansion processing or following implementation of the predetermined dynamic range expansion processing, a luminance histogram creation unit that creates a luminance histogram corresponding to the warning region detected by the warning region detection unit and a luminance histogram corresponding to an entire region of the display image generated by the image processing unit, a superimposing unit that superimposes the luminance histogram corresponding to the warning region and the luminance histogram corresponding to the entire region of the display image, created by the luminance histogram creation unit, onto the display image signal generated by the image processing unit, and a display unit that displays the image on which the luminance histogram corresponding to the warning region and the luminance histogram corresponding to the entire region of the display image have been superimposed by the superimposing unit as a live view image.

BRIEF DESCRIPTION OF THE DRAWINGS

These and other features, aspects, and advantages of the apparatus and methods of the present invention will become better understood with regard to the following description, appended claims, and accompanying drawings.

FIG. 4 is a view showing an example of a gradation determination table stored in a Flash memory.

DETAILED DESCRIPTION OF THE PREFERRED EMBODIMENTS

First Embodiment

Figure 1:
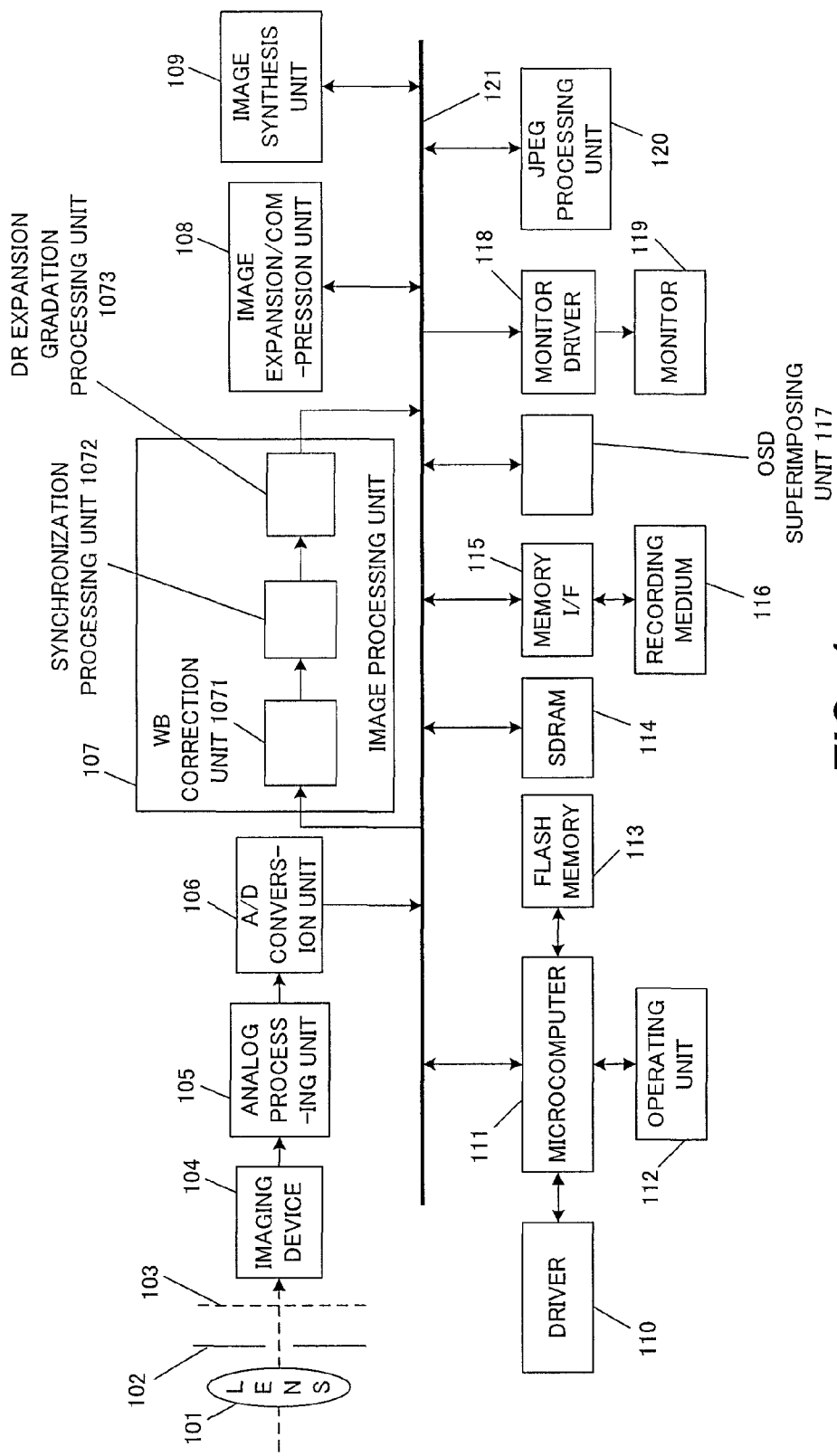
FIG. 1 is a block diagram showing a configuration of a digital camera serving as an image pickup apparatus according to a first embodiment.

FIG. 1 is a block diagram showing a configuration of a digital camera serving as an image pickup apparatus according to a first embodiment. The digital camera according to the first embodiment includes a lens 101, a diaphragm 102, a mechanical shutter 103, an imaging device 104, an analog processing unit 105, an A/D conversion unit 106, an image processing unit 107, an image expansion/compression unit 108, an image synthesis unit 109, a driver 110, a microcomputer 111, an operating unit 112, a Flash memory 113, an SDRAM 114, a memory I/F 115, a recording medium 116, an OSD superimposing unit 117, a monitor driver 118, a monitor 119, a JPEG processing unit 120, and a bus 121.

The lens 101 condenses an optical image of an object on the imaging device 104. The lens 101 may be a single focus lens or a zoom lens.

The driver 110 drives the lens 101 upon reception of an instruction from the microcomputer 111 in order to modify a focal length and a focus position, and also drives the diaphragm 102. The diaphragm 102 is provided in the vicinity of the lens 101 to adjust an amount of light from the object.

The mechanical shutter 103 is driven upon reception of an instruction from the microcomputer 111 to control an amount of time in which the object is exposed to the imaging device 104.

The imaging device 104 is a device in which color filters in a Bayer arrangement are disposed on a front surface of a photodiode constituting each pixel. In the Bayer arrangement, a line on which a red filter and a green filter are disposed alternately in a horizontal direction and a line on which a green filter and a blue filter are disposed alternately in the horizontal direction are provided, and these two lines are disposed alternately in a vertical direction. In this specification, a pixel having a red filter will be referred to as an R pixel, a pixel having a green filter that is adjacent to an R pixel in the horizontal direction will be referred to as a Gr pixel, a pixel having a blue filter will be referred to as a B pixel, and a pixel having a green filter that is adjacent to a B pixel in the horizontal direction will be referred to as a Gb pixel. The imaging device 104 receives the light condensed by the lens 101 on the photodiodes constituting the pixels and performs photoelectric conversion such that a light amount is output to the analog processing unit 105 as an electric charge amount. The imaging device 104 may be a CMOS device or a CCD device.

The analog processing unit 105 reduces reset noise and the like and then performs waveform shaping on an electric signal (analog image signal) read from the imaging device 104, and also performs a gain-up to obtain a target brightness. The A/D conversion unit 106 converts the analog image signal output from the analog processing unit 105 into a digital image signal (to be referred to hereafter as image data).

The bus 121 is a transfer path for transferring various data generated in the interior of the digital camera to the various internal units of the digital camera. The bus 121 is connected to the A/D conversion unit 106, the image processing unit 107, the image expansion/compression unit 108, the image synthesis unit 109, the microcomputer 111, the SDRAM 114, the memory I/F 115, the OSD superimposing unit 117, the monitor driver 118, and the JPEG processing unit 120.

The image data output from the A/D conversion unit 106 are stored temporarily in the SDRAM 114 via the bus 121. The SDRAM 114 is a storage unit for temporarily storing various data such as the image data obtained in the A/D conversion unit 106 and image data processed in the image processing unit 107, the image compression/expansion unit 108, and the image synthesis unit 109.

The image processing unit 107 includes a white balance correction unit 1071 (WB correction unit 1071 hereafter), a synchronization processing unit 1072, and a dynamic range expansion gradation processing unit 1073 (DR expansion gradation processing unit 1073 hereafter), and implements various types of image processing on image data read from the SDRAM 114. The image data obtained following the various processing performed by the image processing unit 107 are stored in the SDRAM 114.

The WB correction unit 1071 performs white balance correction processing on the image data. The synchronization processing unit 1072 synchronizes image data in the Bayer arrangement with image data in which R, G, B information is included in each pixel. The DR expansion gradation processing unit 1073 performs gradation conversion processing for expanding a dynamic range. In this embodiment in particular, the gradation conversion processing for expanding the dynamic range is performed on an image signal obtained by performing image pickup that is underexposed relative to an appropriate exposure. Known processing may be performed as the gradation conversion processing for expanding the dynamic range.

The image expansion/compression unit 108 expands and compresses the image data on the basis of an instruction from the microcomputer 111.

The image synthesis unit (also referred to as a synthesis unit and a synthesized image generation unit) 109 synthesizes a plurality of images having different exposures during pickup and recording of an image having an expanded dynamic range. Further, during live view display, the image synthesis unit 109 synthesizes an image to be displayed on the monitor 119 with a warning pattern to be described below.

When the image data are to be recorded, the JPEG processing unit 120 reads the image data from the SDRAM 114, compresses the read data in accordance with JPEG compression technology, and stores resulting compressed JPEG image data temporarily in the SDRAM 114. The microcomputer (also referred to as an exposure control unit and a superimposing unit) 111 creates a JPEG file by attaching a JPEG header required to construct a JPEG file to the JPEG image data stored in the SDRAM 114, and records the created JPEG file in the recording medium 116 via the memory I/F 115. The recording medium 116 is constituted by a memory card that can be attached to and detached from a camera main body, for example, but is not limited thereto.

The OSD superimposing unit 117 generates onscreen display (OSD) data for displaying various information obtained during image pickup, information obtained during data recording, a luminance histogram of an image, and so on, and superimposes these data on the image data.

The monitor driver 118 displays an image on the monitor 119. Image display includes rec view display in which image data are displayed briefly immediately after image pickup, reproduction display of a JPEG file recorded in the recording medium 116, and moving image display of a live view image (also referred to as a through image) and so on. Further, when a JPEG file recorded in the recording medium 116 is reproduced, the JPEG processing unit 120 reads the JPEG file recorded in the recording medium 116, implements expansion processing thereon, and then stores the expanded image data temporarily in the SDRAM 114. The monitor driver 118 then reads the expanded image data from the SDRAM 114, converts the read image data into a video signal, and outputs the video signal to the monitor 119, on which a corresponding image is displayed.

The microcomputer 111 functions as a control unit to perform overall control of various sequences in the digital camera main body. The driver 110, the operating unit 112, and the Flash memory 113 are connected to the microcomputer 111.

Figure 2:
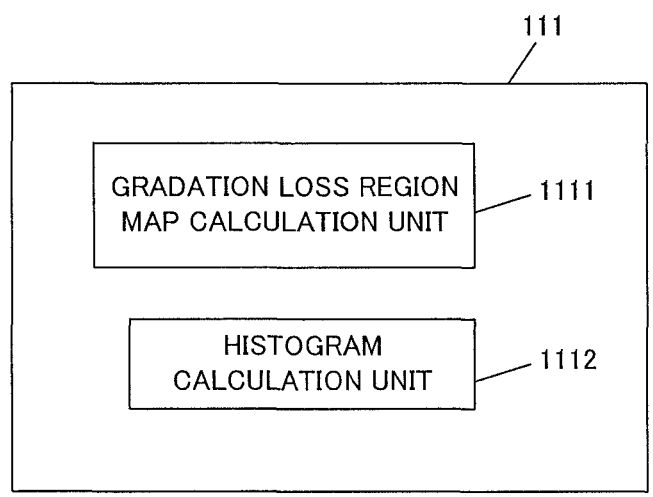
FIG. 2 is a block diagram showing functions executed by the microcomputer.

FIG. 2 is a block diagram showing functions executed by the microcomputer 111. The microcomputer 111 includes, as functions executed thereby, a gradation loss region map calculation unit (also referred to as a warning region detection unit) 1111 and a histogram calculation unit (also referred to as a luminance histogram creation unit) 1112. The gradation loss region map calculation unit 1111 creates a gradation loss region map, to be described below. The histogram calculation unit 1112 creates a luminance histogram corresponding to an entire region of a display image and luminance histograms corresponding to gradation loss regions, to be described below.

The operating unit 112 includes operating members such as a power supply button, a release button, and various input keys. When a user operates one of the operating members of the operating unit 112, the microcomputer 111 executes various sequences corresponding to the user operation. The power supply button is an operating member for issuing ON/OFF instructions in relation to a power supply of the digital camera. When the power supply button is pressed, the power supply of the digital camera is switched ON. When the power supply button is pressed again, the power supply of the digital camera is switched OFF. The release button is formed from a two-step switch consisting of a first release switch and a second release switch. When the release button is half-pressed to switch the first release switch ON, the microcomputer 111 performs image pickup preparation sequences such as AE processing and AF processing. When the release button is fully pressed to switch the second release switch ON, the microcomputer 111 performs image pickup by executing an image pickup sequence.

The Flash memory 113 stores various parameters required to operate the digital camera, such as a white balance gain corresponding to a white balance mode, a color matrix coefficient, and a low pass filter coefficient, a gradation determination table to be described below, a serial number for identifying the digital still camera, and so on. The Flash memory 113 also stores various programs executed by the microcomputer 111. The microcomputer 111 executes various processing in accordance with the programs stored in the flash memory 113 while reading parameters required for the various sequences from the flash memory 113.

In the image pickup apparatus according to the first embodiment, a number of images to be used during synthesis and exposure differences between the images are determined in accordance with a dynamic range expansion ratio set by the user, whereupon image pickup/synthesis processing is performed. A resulting image having an expanded dynamic range is then recorded. For example, when the dynamic range expansion ratio on a bright portion side is 200%, an appropriately exposed image is synthesized with an image that is underexposed by a single stage relative to the appropriate exposure.

Further, during live view display (through image display) in the image pickup apparatus according to the first embodiment, image pickup is performed in an underexposed condition in which the dynamic range expansion ratio on the bright portion side is at a maximum, regardless of the set dynamic range expansion ratio. Gradation conversion processing for expanding the dynamic range is then performed on image data obtained as a result, whereupon the resulting image is displayed on the monitor 119.

Figure 3:
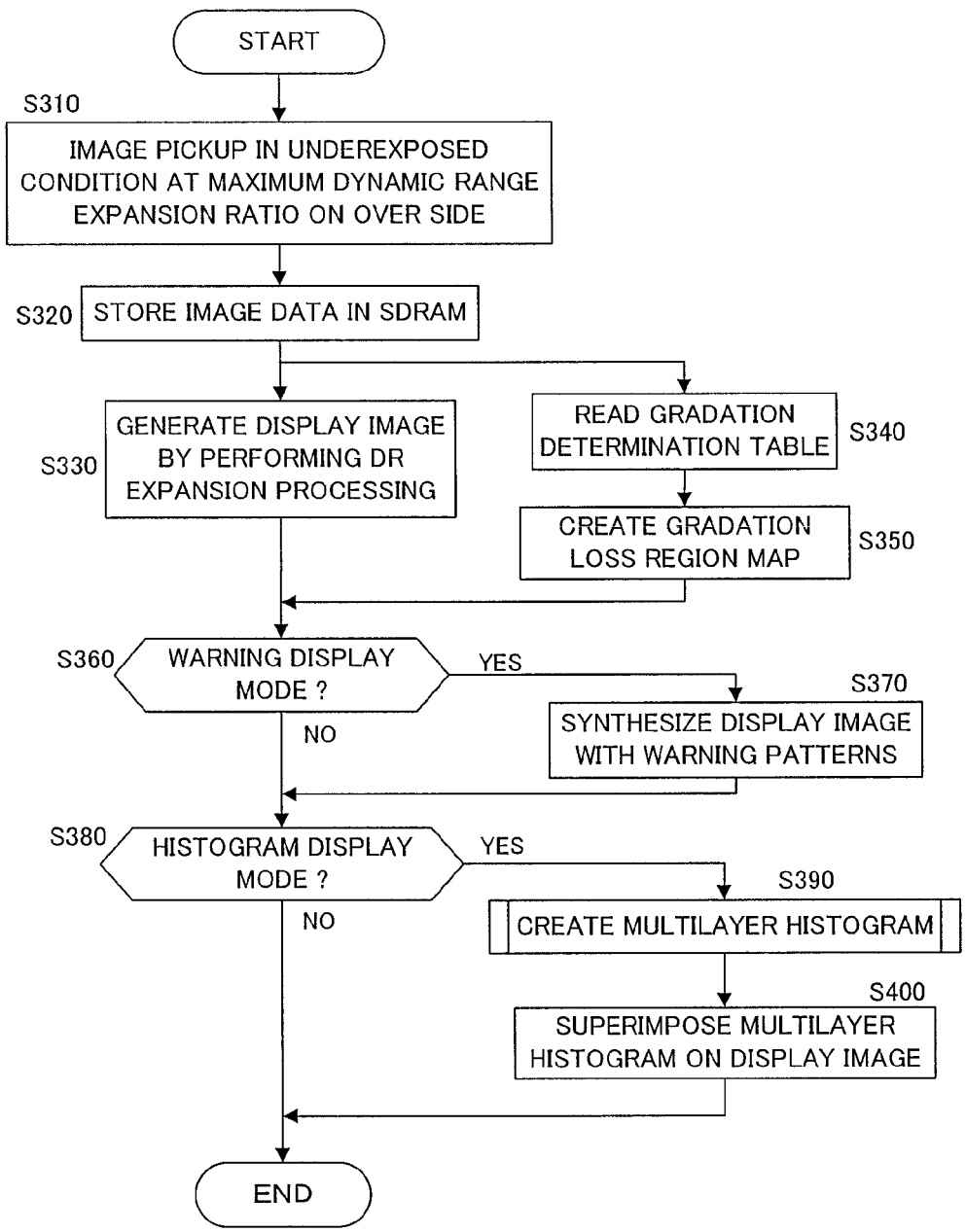
FIG. 3 is a flowchart showing a flow of processing performed in the image pickup apparatus according to the first embodiment during live view display.

FIG. 3 is a flowchart showing a flow of processing performed in the image pickup apparatus according to the first embodiment during live view display.

In a step S310, image pickup is performed in an underexposed condition at the maximum dynamic range expansion ratio on an over side (the bright portion side). Underexposure means that the light amount is smaller than that of an appropriate exposure corresponding to an object luminance. Here, the maximum dynamic range expansion ratio on the over side is set at 400%. Hence, in the step S310, image pickup is performed so as to be underexposed by two stages relative to the appropriate exposure.

In a step S320, image data obtained as a result of the image pickup performed in the step S310 are stored in the SDRAM 114.

Processing of a step S330 is performed in parallel with processing of steps S340 and S350. It should be noted, however, that one of these processes may be performed first, followed by the other process.

In the step S330, the DR expansion gradation processing unit 1073 reads the image data stored in the step S320 from the SDRAM 114 and performs gradation conversion processing for expanding the dynamic range thereon to generate a display image to be displayed on the monitor 119. Here, different gradation conversion processing is performed on each pixel of the image data.

In the step S340, the gradation loss region map calculation unit 1111 reads the gradation determination table from the Flash memory 113.

FIG. 4 is a view showing an example of the gradation determination table stored in the Flash memory 113. The gradation determination table defines gradation range conditions in which a loss of gradation occurs when image pickup is performed in exposure conditions corresponding to respective dynamic range expansion ratios. The loss of gradation is the disappearance of gradation, for example blown out highlights in a bright part and blocked up shadows in a dark part.

As shown in FIG. 4, a gradation range having a lower limit pixel value of TH_O_1 and an upper limit pixel value of TH_O_1 is a blown out highlights region in which the dynamic range expansion ratio on the over side is at 400% (the maximum). Here, this region will be referred to as a "warning region 1".

A gradation range having a lower limit pixel value of TH_O_2 (TH_O_2<TH_O_1) and an upper limit pixel value of TH_O_1 is a blown out highlights region in which the dynamic range expansion ratio on the over side is at 300%. Here, this region will be referred to as a "warning region 2".

A gradation range having a lower limit pixel value of TH_O_3 (TH_O_3<TH_O_2) and an upper limit pixel value of TH_O_1 is a blown out highlights region in which the dynamic range expansion ratio on the over side is at 200%. Here, this region will be referred to as a "warning region 3".

A gradation range having a lower limit pixel value of TH_O_4 (TH_O_4<TH_O_3) and an upper limit pixel value of TH_O_1 is a blown out highlights region in which the dynamic range expansion ratio on the over side is at 100%, or in other words when the dynamic range is not expanded. Here, this region will be referred to as a "warning region 4".

Further, a gradation range having a lower limit pixel value of 0 and an upper limit pixel value of TH_A_1 is a blocked up shadows region in which the dynamic range expansion ratio on an under side is at 400%. Here, this region will be referred to as a "warning region 5".

A gradation range having a lower limit pixel value of 0 and an upper limit pixel value of TH_A_2 (TH_A_2>TH_A_1) is a blocked up shadows region in which the dynamic range expansion ratio on the under side is at 300%. Here, this region will be referred to as a "warning region 6".

A gradation range having a lower limit pixel value of 0 and an upper limit pixel value of TH_A_3 (TH_A_3>TH_A_2) is a blocked up shadows region in which the dynamic range expansion ratio on the under side is at 200%. Here, this region will be referred to as a "warning region 7".

A gradation range having a lower limit pixel value of 0 and an upper limit pixel value of TH_A_4 (TH_A_4>TH_A_3) is a blocked up shadows region in which the dynamic range expansion ratio on the under side is at 100%, or in other words when the dynamic range is not expanded. Here, this region will be referred to as a "warning region 8".

When the dynamic range expansion ratio is set at 400% and a gradation bit width of the underexposed image stored in the Flash memory 113 is set at 12 bits, the lower limit values TH_O_1 to TH_O_4 defining the blown out highlights regions at the respective dynamic range expansion ratios are expressed respectively by following Equations (1) to (4). In the equations, ^ represents a power.

$$TH\_O\_1 = 2^{16} \tag{1}$$

$$TH\_O\_2 = 2^{16} \times 300/400 \tag{2}$$

$$TH\_O\_3 = 2^{16} \times 200/400 \tag{3}$$

$$TH\_O\_4 = 2^{16} \times 100/400 \tag{4}$$

As regards the under side (dark portion side) gradation ranges, the loss of gradation in the dark portion is mainly caused by gradation burying due to dark state noise, and therefore the under side gradation ranges are set at values corresponding to dark state noise dispersion. For example, assuming that σ represents a dispersion value of the dark state noise of a 12 bit image obtained when the dynamic range expansion ratio is maximized (set at 400%) in both the bright portion and the dark portion, the upper limit values TH_A_1 to TH_A_4 defining the blocked up shadows regions at the respective dynamic range expansion ratios are expressed respectively by following Equations (5) to (8).

$$TH\_A\_1 = \sigma \tag{5}$$

$$TH\_A\_2 = \sigma \times 400/300 \tag{6}$$

$$TH\_A\_3 = \sigma \times 400/200 \tag{7}$$

$$TH\_A\_4 = \sigma \times 400/100 \tag{8}$$

It should be noted that since the regions of gradation loss on the dark portion side are caused by the amount of noise, values thereof may be modified in accordance with an ISO sensitivity.

In the step S350, the gradation loss region map calculation unit 1111 creates a gradation loss region map. More specifically, the gradation loss region map calculation unit 1111 reads the underexposed image (the image prior to dynamic range expansion processing) stored in the SDRAM 114 in the step S320, compares a pixel value of each pixel of the read image with the gradation ranges of the gradation determination table read in the step S340, and creates a gradation loss region map indicating warning regions, from among the warning region 1 to the warning region 8, to which image regions of the underexposed image correspond.

Figure 5A:
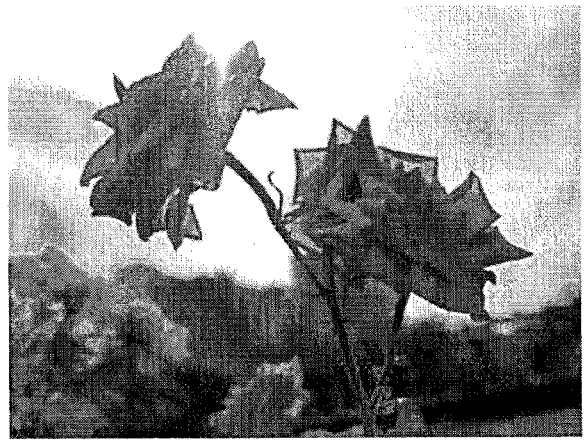
FIG. 5A is a view showing an example of an image obtained by performing image pickup in an underexposed condition in which a dynamic range expansion ratio on the over side is at the maximum.
Figure 5B:
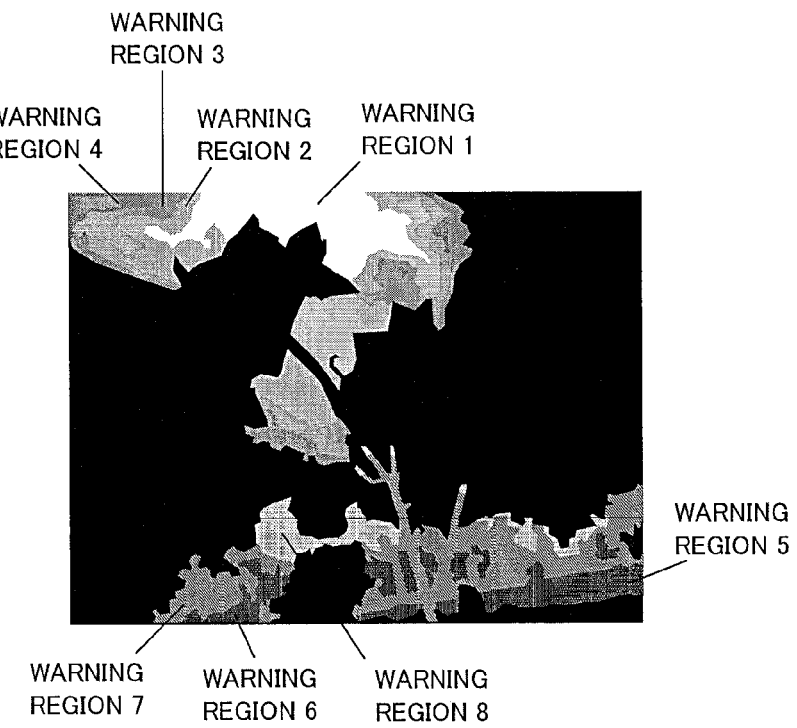
FIG. 5B is a view showing an example of a gradation loss region map created on the basis of the image shown in FIG. 5A.

FIG. 5A is a view showing an example of an image obtained by performing image pickup in an underexposed condition in which the dynamic range expansion ratio on the over side is at the maximum, while FIG. 5B is a view showing an example of a gradation loss region map created on the basis of the image shown in FIG. 5A. FIG. 5A shows an image of a flower. The image obtained in the actual image pickup operation is a color image, but is shown as a monochrome image in FIG. 5.

It should be noted that since pixel values are input on multiple channels (R, Gr, Gb, and B in the case of a Bayer image), a maximum value of all of the channels and a minimum value of all of the channels may be compared with the gradation ranges on the gradation determination table when performing gradation determination on the bright portion side and the dark portion side, respectively.

Here, the DR expansion gradation processing unit 1073 may perform identical gradation conversion processing on all of the pixels of the image data as the dynamic range expansion processing. In this case, the gradation loss region map calculation unit 1111 creates the gradation loss region map by comparing the pixel value of each pixel of the image obtained following the dynamic range expansion processing with the gradation ranges on the gradation determination table.

In a step S360 of FIG. 3, a determination is made as to whether or not the camera is set in a warning display mode. In the warning display mode, the gradation loss regions, or in other words the blown out highlights regions and blocked up shadows regions, of the image corresponding to the dynamic range expansion ratio are displayed together with the image having the expanded dynamic range. When the warning display mode has been set by the user, the routine advances to a step S370, and when the warning display mode has not been set, the routine advances to a step S380.

In the step S370, the image synthesis unit 109 synthesizes the display image created in the step S330 with warning patterns. The warning patterns indicate the regions in which the loss of gradation occurs in accordance with the dynamic range expansion ratio, and include a warning pattern 1 and a warning pattern 2, as will be described below.

Figures 6, 7:
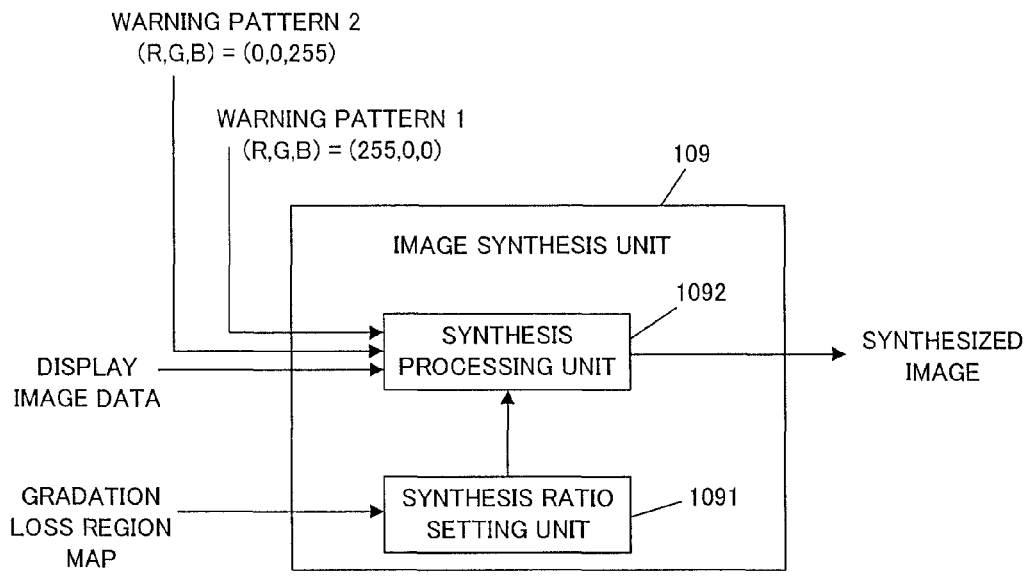
FIG. 6 is a block diagram showing a configuration of an image synthesis unit in detail.
FIG. 7 is a view showing examples of the synthesis ratios of a warning pattern 1, a warning pattern 2, and a display image in accordance with the respective warning regions 1 to 8 of the gradation loss region map.

FIG. 6 is a block diagram showing a configuration of the image synthesis unit 109 in detail. The image synthesis unit 109 includes a synthesis ratio setting unit 1091 and a synthesis processing unit 1092.

The synthesis ratio setting unit 1091 sets respective synthesis ratios for "warning pattern 1" and "warning pattern 2", which are prepared in advance, and the display image generated in the step S330 of FIG. 3 on the basis of the gradation loss region map created by the gradation loss region map calculation unit 1111. The warning pattern 1 takes the form of a red image, and the warning pattern 2 takes the form of a blue image.

FIG. 7 is a view showing examples of the synthesis ratios of the warning pattern 1, the warning pattern 2, and the display image in accordance with the respective warning regions 1 to 8 of the gradation loss region map. In the warning region 1, for example, the synthesis ratio of the warning pattern 1 is set at 100%, and the respective synthesis ratios of the warning pattern 2 and the display image are set at 0%. Further, in the warning region 6, the synthesis ratio of the warning pattern 1 is set at 0%, the synthesis ratio of the warning pattern 2 is set at 50%, and the synthesis ratio of the display image is set at 50%.

The synthesis processing unit 1092 generates a synthesized image by synthesizing the display image with either the red image corresponding to the warning pattern 1 or the blue image corresponding to the warning pattern 2 on the basis of the synthesis ratios set by the synthesis ratio setting unit 1091. More specifically, in each of the warning regions 1 to 8, the pixel values of the respective pixels in the warning regions are synthesized with pixel values ((R, G, B)=(255, 0, 0)) of the red image corresponding to the warning pattern 1 or pixel values ((R, G, B)=(0, 0, 255)) of the blue image corresponding to the warning pattern 2 on the basis of the set synthesis ratios. Regions of the display image other than the warning regions are left as is. It should be noted, however, that the regions other than the warning regions may be synthesized by setting the synthesis ratio of the display image at 100% and the respective synthesis ratios of the warning pattern 1 and the warning pattern 2 at 0%.

Figure 8A:
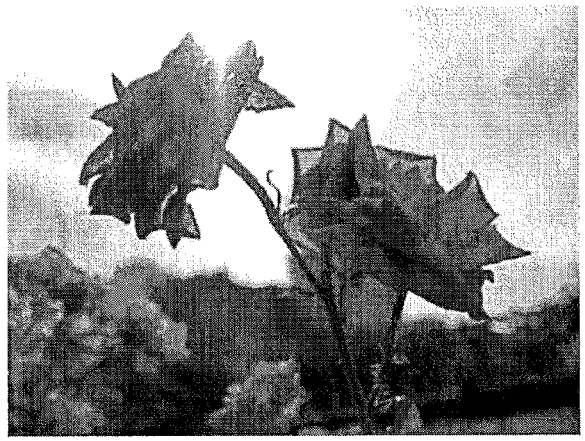
FIG. 8A shows the display image.
Figure 8B:
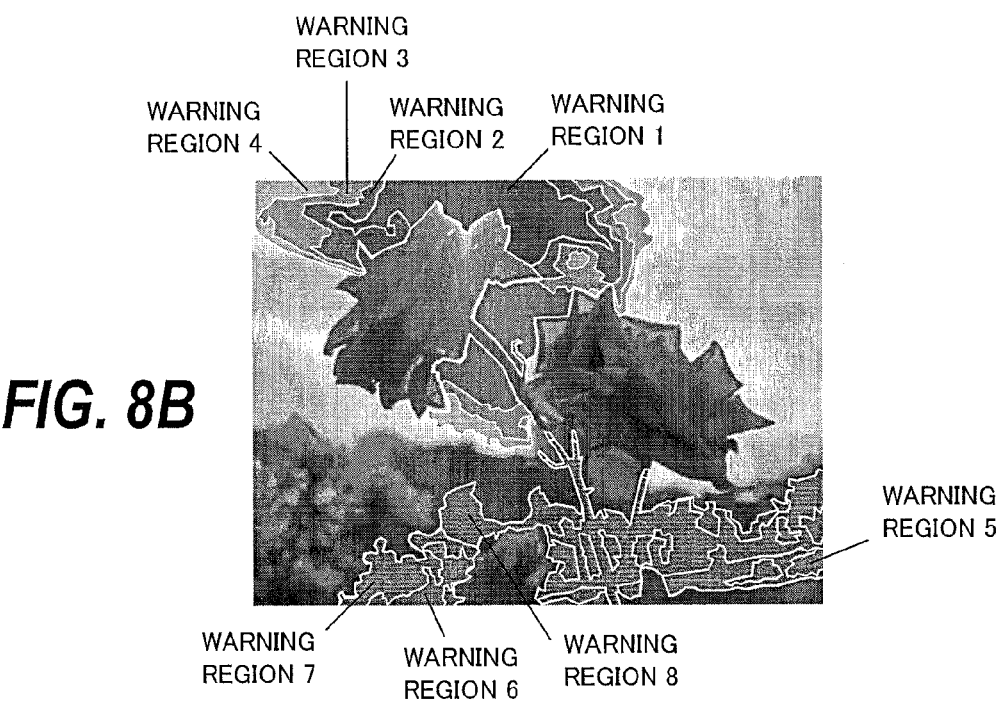
FIG. 8B shows the result of synthesizing the display image shown in FIG. 8A with the warning pattern 1 and the warning pattern 2.

FIG. 8A shows the display image, while FIG. 8B shows the result of synthesizing the display image shown in FIG. 8A with the warning pattern 1 and the warning pattern 2. In FIG. 8B, the respective warning regions 1 to 8 are filled in using diagonal lines or dots to facilitate recognition thereof, but in actuality, the display image synthesized with the warning pattern 1 or the warning pattern 2 is displayed without diagonal lines and dots.

It is possible to confirm from the synthesized image synthesizing the display image and the warning pattern the degree to which the gradation loss regions narrow from light color regions (a light blue region or a light red region) to deep color regions (a deep blue region or a deep red region) as the dynamic range expansion ratio is increased in both the dark portion and the bright portion. In other words, the user can easily grasp the gradation loss regions occurring when the dynamic range expansion ratio is modified without modifying the dynamic range expansion ratio.

In the above description, the gradation loss regions occurring when the over side dynamic range is set at 100%, 200%, 300%, and 400% and the under side dynamic range is set at 100%, 200%, 300%, and 400% are displayed. However, measures may be taken on the basis of the dynamic range expansion ratio set by the user such that warning patterns for gradation loss regions occurring at lower expansion ratios than a currently set expansion ratio are not displayed. When display is performed in this manner, information relating to the gradation loss regions having lower expansion ratios than the current expansion ratio, which is assumed to be unnecessary, is not displayed, and therefore only information assumed to be necessary is displayed. As a result, the image can be viewed more easily.

In a step S380 of FIG. 3, a determination is made as to whether or not the camera is set in a histogram display mode. The histogram display mode is a mode in which a luminance histogram corresponding to the entire region of the display image and luminance histograms corresponding to the warning regions are displayed on the monitor 119 together with the display image. When the histogram display mode has been set by the user, the routine advances to a step S390, and when the histogram display mode has not been set, the processing of the flowchart shown in FIG. 3 is terminated.

In the step S390, processing is performed to create a multilayer histogram. This processing is performed by the microcomputer 111. The multilayer histogram creation processing will now be described in detail using a flowchart shown in FIG. 9.

Figure 9:
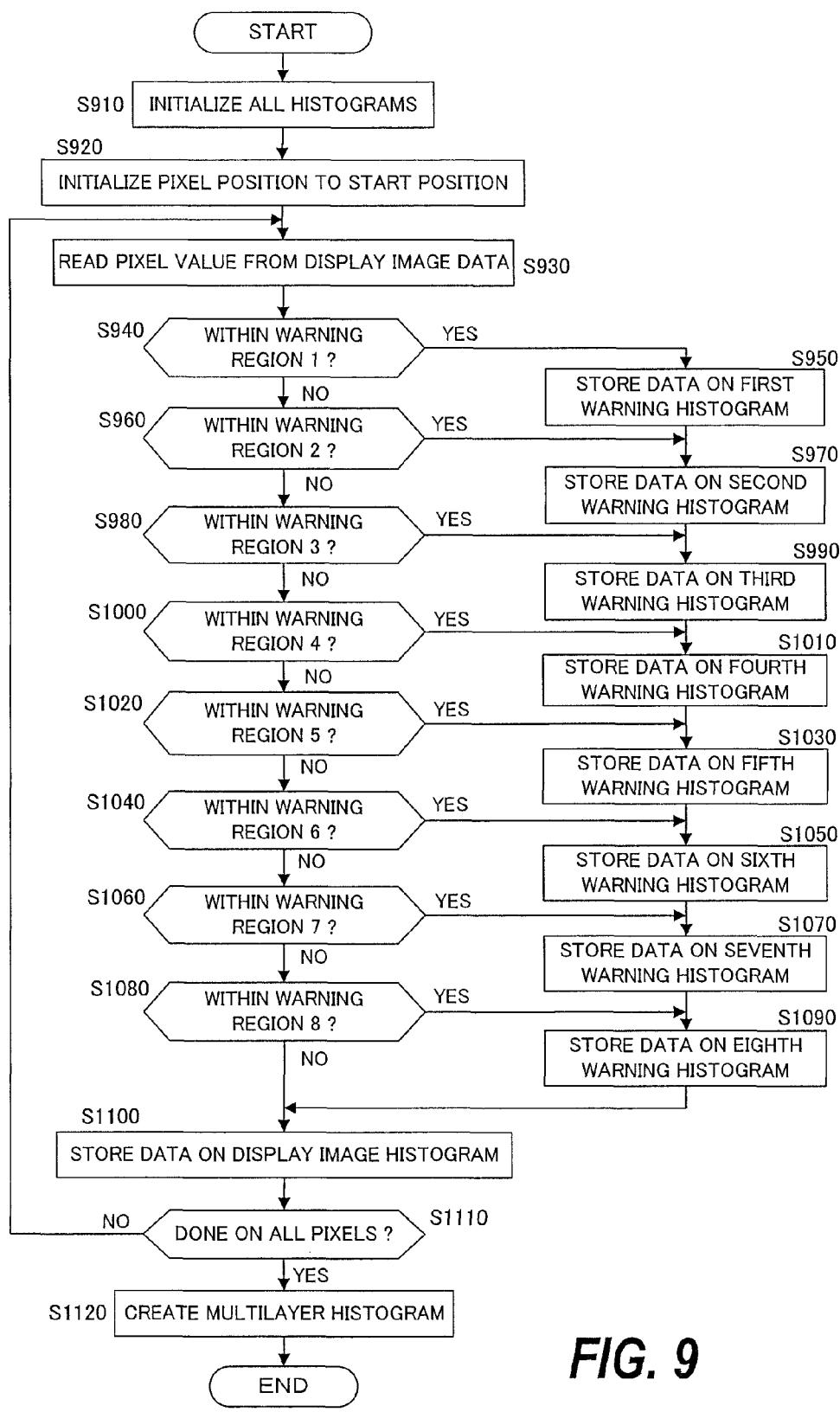
FIG. 9 is a flowchart showing the detail of a multilayer histogram creation processing.

FIG. 9 is a flowchart showing the processing of the step S390 in the flowchart of FIG. 3, or in other words showing in detail the multilayer histogram creation processing.

In a step S910, all histograms are initialized. All histograms include first to eighth warning histograms, to be described below, and a display image histogram.

In a step S920, a processing subject pixel position of the display image data is initialized to a start position. The start position is a lower left corner position of the image, for example.

In a step S930, a processing subject pixel value is read from the display image data. After that, the region determination results are read from the gradation loss region map created by the gradation loss region map calculation unit 1111.

In a step S940, a determination is made as to whether or not the processing subject pixel corresponds to the warning region 1. When it is determined that the processing subject pixel corresponds to the warning region 1, the routine advances to a step S950, and when it is determined that the processing subject pixel does not correspond to the warning region 1, the routine advances to a step S960.

In the step S950, data are stored on the first warning histogram on the basis of the pixel value of the processing subject pixel. The first warning histogram is a histogram showing an object luminance distribution of a pixel corresponding to the warning region 1. Here, therefore, processing is performed to increase a frequency (a pixel count) corresponding to the pixel value (luminance value) of the processing subject pixel by one on the first warning histogram. When the processing of the step S950 is complete, the routine advances to a step S970.

In the step S960, a determination is made as to whether or not the processing subject pixel corresponds to the warning region 2. When it is determined that the processing subject pixel corresponds to the warning region 2, the routine advances to the step S970, and when it is determined that the processing subject pixel does not correspond to the warning region 2, the routine advances to a step S980.

In the step S970, data are stored on the second warning histogram on the basis of the pixel value of the processing subject pixel. The second warning histogram is a histogram showing the object luminance distribution of a pixel corresponding to the warning region 2. Here, therefore, processing is performed to increase the frequency (the pixel count) corresponding to the pixel value (luminance value) of the processing subject pixel by one on the second warning histogram. When the processing of the step S970 is complete, the routine advances to a step S990.

In the step S980, a determination is made as to whether or not the processing subject pixel corresponds to the warning region 3. When it is determined that the processing subject pixel corresponds to the warning region 3, the routine advances to the step S990, and when it is determined that the processing subject pixel does not correspond to the warning region 3, the routine advances to a step S1000.

In the step S990, data are stored on the third warning histogram on the basis of the pixel value of the processing subject pixel. The third warning histogram is a histogram showing the object luminance distribution of a pixel corresponding to the warning region 3. Here, therefore, processing is performed to increase the frequency (the pixel count) corresponding to the pixel value (luminance value) of the processing subject pixel by one on the third warning histogram. When the processing of the step S990 is complete, the routine advances to a step S1010.

In the step S1000, a determination is made as to whether or not the processing subject pixel corresponds to the warning region 4. When it is determined that the processing subject pixel corresponds to the warning region 4, the routine advances to the step S1010, and when it is determined that the processing subject pixel does not correspond to the warning region 4, the routine advances to a step S1020.

In the step S1010, data are stored on the fourth warning histogram on the basis of the pixel value of the processing subject pixel. The fourth warning histogram is a histogram showing the object luminance distribution of a pixel corresponding to the warning region 4. Here, therefore, processing is performed to increase the frequency (the pixel count) corresponding to the pixel value (luminance value) of the processing subject pixel by one on the fourth warning histogram. When the processing of the step S1010 is complete, the routine advances to a step S1030.

In the step S1020, a determination is made as to whether or not the processing subject pixel corresponds to the warning region 5. When it is determined that the processing subject pixel corresponds to the warning region 5, the routine advances to the step S1030, and when it is determined that the processing subject pixel does not correspond to the warning region 5, the routine advances to a step S1040.

In the step S1030, data are stored on the fifth warning histogram on the basis of the pixel value of the processing subject pixel. The fifth warning histogram is a histogram showing the object luminance distribution of a pixel corresponding to the warning region 5. Here, therefore, processing is performed to increase the frequency (the pixel count) corresponding to the pixel value (luminance value) of the processing subject pixel by one on the fifth warning histogram. When the processing of the step S1030 is complete, the routine advances to a step S1050.

In the step S1040, a determination is made as to whether or not the processing subject pixel corresponds to the warning region 6. When it is determined that the processing subject pixel corresponds to the warning region 6, the routine advances to the step S1050, and when it is determined that the processing subject pixel does not correspond to the warning region 6, the routine advances to a step S1060.

In the step S1050, data are stored on the sixth warning histogram on the basis of the pixel value of the processing subject pixel. The sixth warning histogram is a histogram showing the object luminance distribution of a pixel corresponding to the warning region 6. Here, therefore, processing is performed to increase the frequency (the pixel count) corresponding to the pixel value (luminance value) of the processing subject pixel by one on the sixth warning histogram. When the processing of the step S1050 is complete, the routine advances to a step S1070.

In the step S1060, a determination is made as to whether or not the processing subject pixel corresponds to the warning region 7. When it is determined that the processing subject pixel corresponds to the warning region 7, the routine advances to the step S1070, and when it is determined that the processing subject pixel does not correspond to the warning region 7, the routine advances to a step S1080.

In the step S1070, data are stored on the seventh warning histogram on the basis of the pixel value of the processing subject pixel. The seventh warning histogram is a histogram showing the object luminance distribution of a pixel corresponding to the warning region 7. Here, therefore, processing is performed to increase the frequency (the pixel count) corresponding to the pixel value (luminance value) of the processing subject pixel by one on the seventh warning histogram. When the processing of the step S1070 is complete, the routine advances to a step S1090.

In the step S1080, a determination is made as to whether or not the processing subject pixel corresponds to the warning region 8. When it is determined that the processing subject pixel corresponds to the warning region 8, the routine advances to the step S1090, and when it is determined that the processing subject pixel does not correspond to the warning region 8, the routine advances to a step S1100.

In the step S1090, data are stored on the eighth warning histogram on the basis of the pixel value of the processing subject pixel. The eighth warning histogram is a histogram showing the object luminance distribution of a pixel corresponding to the warning region 8. Here, therefore, processing is performed to increase the frequency (the pixel count) corresponding to the pixel value (luminance value) of the processing subject pixel by one on the eighth warning histogram. When the processing of the step S1090 is complete, the routine advances to the step S1100.

In the step S1100, data are stored on the display image histogram. The display image histogram is a histogram showing the object luminance distribution of all of the pixels of the display image. Here, therefore, processing is performed to increase the frequency (the pixel count) corresponding to the pixel value (luminance value) of the processing subject pixel by one on the image display histogram.

In a step S1110, a determination is made as to whether or not the processing for storing data on the histogram has been performed on all of the pixels of the display image. When it is determined that the processing has not been performed on all of the pixels, the processing subject pixel is changed, whereupon the routine returns to the step S930. When it is determined that the processing has been performed on all of the pixels, the routine advances to a step S1120.

In the step S1120, a multilayer histogram is created by synthesizing the first warning histogram, the second warning histogram, the third warning histogram, the fourth warning histogram, the fifth warning histogram, the sixth warning histogram, the seventh warning histogram, the eighth warning histogram, and the display image histogram. To create the multilayer histogram, the first warning histogram, the second warning histogram, the third warning histogram, the fourth warning histogram, the fifth warning histogram, the sixth warning histogram, the seventh warning histogram, the eighth warning histogram, and the display image histogram are overlapped in that order from above.

Figure 10:
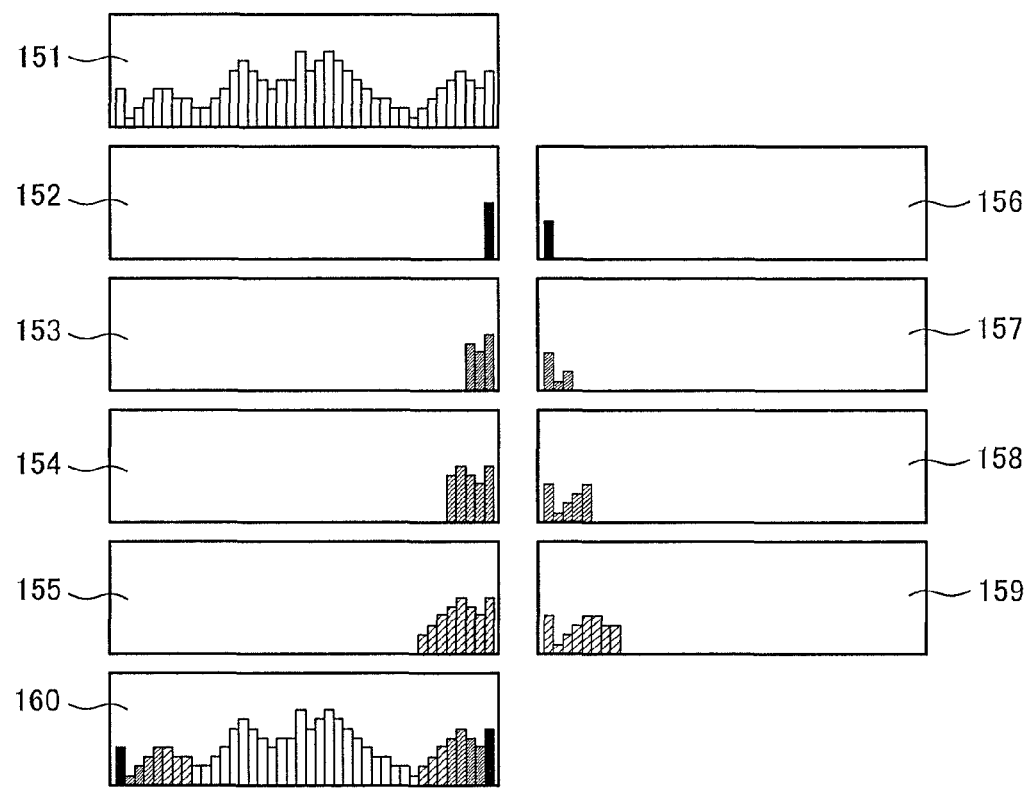
FIG. 10 is a view showing an example of a display image histogram, first to eighth warning histograms, and a multilayer histogram.

FIG. 10 is a view showing an example of a display image histogram 151, first to eighth warning histograms 152 to 159, and a multilayer histogram 160. On the multilayer histogram 160, the display image histogram 151 and the first to eighth warning histograms 152 to 159 are preferably displayed in different colors to enable identification thereof. Correspondence between the warning regions and the warning histograms can be grasped particularly easily by making the colors of the warning patterns corresponding to the respective warning regions 1 to 8 identical to the colors of the corresponding warning histograms.

In a step S400 of the flowchart shown in FIG. 3, the OSD superimposing unit 117 superimposes the multilayer histogram created in the step S390 on the display image and displays the result on the monitor 119. When the processing of the step S370 has been performed at this time, the multilayer histogram is superimposed on the display image synthesized with the warning patterns and the result is displayed on the monitor 119.

Figure 11:
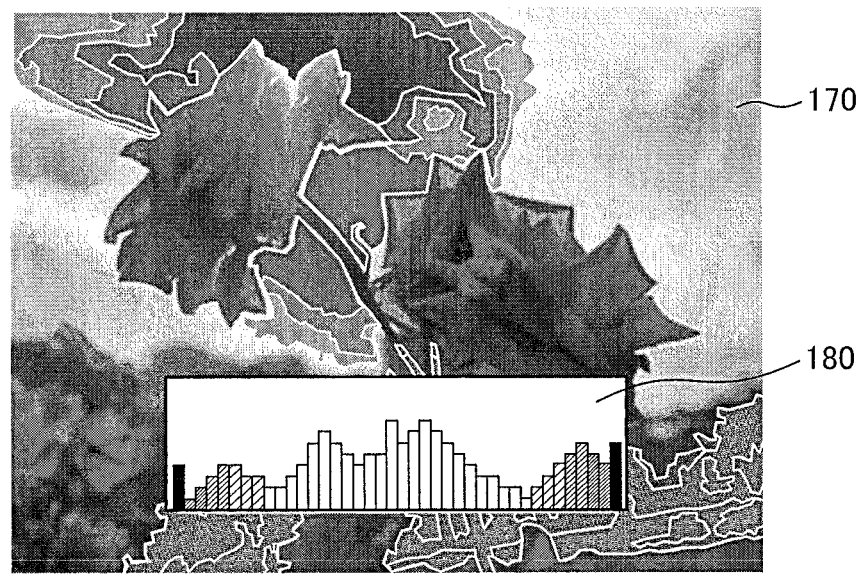
FIG. 11 is a view showing an example of the multilayer histogram superimposed on a display image synthesized with the warning patterns.

FIG. 11 is a view showing an example of a multilayer histogram 180 superimposed on a display image 170 synthesized with the warning patterns. The position in which the multilayer histogram is superimposed may be set as desired, and is not limited to the position shown in FIG. 11.

It should be noted that when the camera is set in the histogram display mode, the multilayer histogram may be superimposed on the display image not synthesized with the warning patterns and the result may be displayed on the monitor 119.

In the image pickup apparatus according to the first embodiment, a display image signal is generated by implementing predetermined dynamic range expansion processing on an image signal obtained through underexposed image pickup, and image regions including pixels within a predetermined gradation range are detected as warning regions from an image signal either prior to implementation of the predetermined dynamic range expansion processing or following implementation of the predetermined dynamic range expansion processing. Warning patterns corresponding to the detected warning regions are then synthesized with the display image signal, whereupon a resulting synthesized image is displayed as a live view image. As a result, the user can confirm whether or not gradation loss corresponding to the dynamic range expansion ratio occurs without modifying the dynamic range expansion ratio.

Further, different gradation conversion processing is performed on each pixel of the image, and therefore, when the predetermined dynamic range expansion processing is performed, regions in which the loss of gradation occurs in accordance with the dynamic range expansion ratio are detected as the warning regions from the image signal prior to implementation of the predetermined dynamic range expansion processing. As a result, it is possible to avoid a situation in which gradation determination is performed on the image signal following the dynamic range expansion processing such that the gradation loss regions cannot be detected accurately.

In the image pickup apparatus according to the first embodiment in particular, a plurality of regions in which gradation loss occurs in accordance with a plurality of dynamic range expansion ratios are detected as the warning regions, whereupon the warning patterns corresponding to the plurality of warning regions are synthesized with the display image signal at a synthesis ratio corresponding to the plurality of warning regions. Therefore, the user can confirm whether or not gradation loss corresponding to the plurality of dynamic range expansion ratios occurs and confirm a range of the gradation loss without modifying the dynamic range expansion ratio.

Further, luminance histograms corresponding to the warning regions and a luminance histogram corresponding to the entire region of the display image are created, whereupon the warning patterns corresponding to the warning regions are synthesized with the luminance histograms corresponding to the warning regions and the luminance histogram corresponding to the entire region of the display image on the display image signal. As a result, the range of the gradation loss can be displayed using a luminance histogram as well as the warning patterns.

In the image pickup apparatus according to the first embodiment in particular, a plurality of regions in which the loss of gradation occurs in accordance with a plurality of dynamic range expansion ratios are detected as the warning regions, whereupon a plurality of luminance histograms corresponding to the plurality of warning regions are created. Therefore, the user can confirm whether or not gradation loss corresponding to the plurality of dynamic range expansion ratios occurs and confirm the range of the gradation loss from the luminance histograms without modifying the dynamic range expansion ratio. At this time, the plurality of warning regions are displayed in respectively different colors and the plurality of luminance histograms corresponding to the plurality of warning regions are displayed in respectively identical colors to the display colors of the warning regions. As a result, correspondence relationships between the warning regions and the luminance histograms can be grasped easily.

Second Embodiment

In the image pickup apparatus according to the first embodiment, the predetermined dynamic range expansion processing is implemented on image data obtained by performing image pickup in an underexposed condition in which the dynamic range expansion ratio on the over side (the bright portion side) is at a maximum, whereupon the result is synthesized with the warning patterns. In an image pickup apparatus according to a second embodiment, the predetermined dynamic range expansion processing is implemented on image data obtained by synthesizing image data obtained by performing image pickup in an underexposed condition in which the dynamic range expansion ratio on the over side (the bright portion side) is at a maximum and image data obtained by performing image pickup in an overexposed condition in which the dynamic range expansion ratio on the under side (the dark portion side) is at a maximum, whereupon the result is synthesized with the warning patterns.

The image pickup apparatus according to the second embodiment is configured identically to the image pickup apparatus according to the first embodiment, shown in FIG. 1. However, the image synthesis unit 109 generates a synthesized image by synthesizing image data obtained by performing image pickup in an underexposed condition in which the dynamic range expansion ratio on the over side (the bright portion side) is at a maximum and image data obtained by performing image pickup in an overexposed condition in which the dynamic range expansion ratio on the under side (the dark portion side) is at a maximum.

Figure 12:
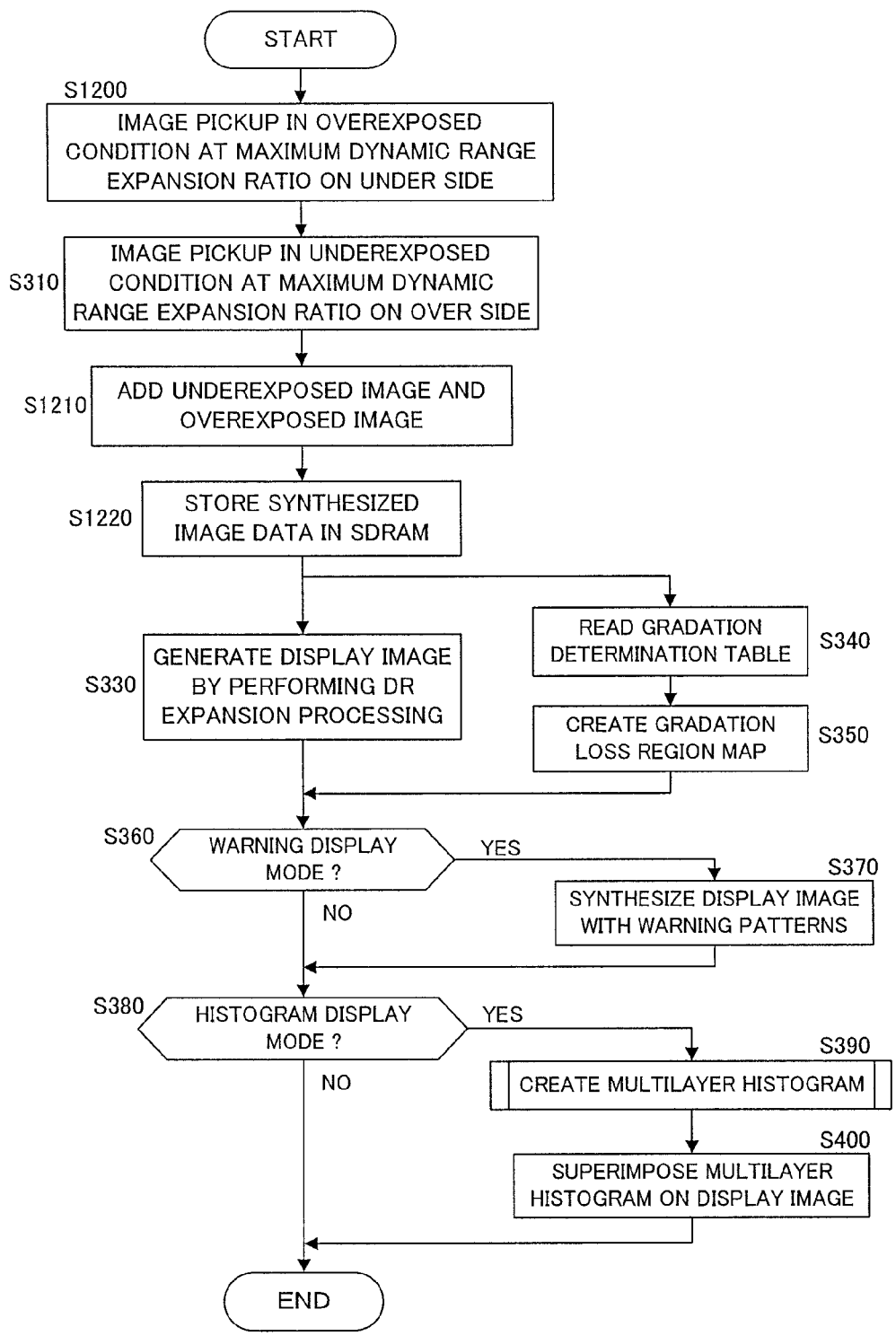
FIG. 12 is a flowchart showing a flow of processing performed in the image pickup apparatus according to the second embodiment to display a live view image.

FIG. 12 is a flowchart showing a flow of processing performed in the image pickup apparatus according to the second embodiment to display a live view image having an expanded dynamic range on the monitor 119. Steps in which identical processing to that of the flowchart shown in FIG. 3 is performed have been allocated identical reference numerals, and detailed description thereof has been omitted.

In a step S1200, image pickup is performed in an overexposed condition in which the dynamic range expansion ratio on the under side (the dark portion side) is at a maximum. Overexposure means that the light amount is larger than that of an appropriate exposure corresponding to the object luminance. Here, the maximum dynamic range expansion ratio on the under side is set at 400%. Hence, in the step S1200, image pickup is performed so as to be overexposed by two stages relative to the appropriate exposure.

In a step S1210 following the step S310, the image synthesis unit 109 generates a synthesized image by adding together the underexposed image obtained in the image pickup operation performed in the step S1200 and a result of multiplying the overexposed image obtained by the image pickup operation performed in the step S310 by a gain value GA. The gain value GA is shown in a following Equation (9). In Equation (9), EV_over represents an exposure of the overexposed condition, EV_under represents an exposure of the underexposed condition, and ^ represents a power.

$$GA=(1/2)^{\wedge}(EV\_over-EV\_under) \quad (9)$$

In a step S1220, the synthesized image obtained by the synthesis processing of the step S1210 is stored in the SDRAM 114.

Processing following the step S1220 is identical to the processing of the flowchart shown in FIG. 3.

In the image pickup apparatus according to the second embodiment, a synthesized image signal is generated by synthesizing an image signal obtained by performing underexposed image pickup and an image signal obtained by performing overexposed image pickup, and a display image signal is generated by implementing predetermined dynamic range expansion processing on the generated synthesized image signal. An image formed by synthesizing the display image signal with the warning patterns corresponding to the warning regions is then displayed as a live view image. As a result, similarly to the first embodiment, the user can confirm whether or not gradation loss corresponding to the dynamic range expansion ratio occurs without modifying the dynamic range expansion ratio. Further, the display image is generated by implementing the dynamic range expansion processing on the image obtained by synthesizing the underexposed image and the overexposed image, and therefore an image on which dark portion noise is suppressed and the dark portion dynamic range is expanded to a maximum can be displayed as a live view image.

Similarly to the first embodiment, when the camera is set in the histogram display mode, the multilayer histogram may be superimposed on the display image not synthesized with the warning patterns and the result may be displayed on the monitor 119.

This invention is not limited to the embodiments described above, and during implementation, constituent elements thereof may be modified within a scope that does not depart from the spirit of the invention. Further, by appropriately combining pluralities of the constituent elements disposed in the above embodiments, various inventions can be formed. For example, several constituent elements may be omitted from the constituent elements disclosed in the embodiments.

In the above embodiments, a digital camera was described as an example of the image pickup apparatus, but the invention may be applied to any camera having a live view display function, such as a video camera or a movie camera. This invention may also be applied to a camera installed in a portable telephone, a portable information terminal (PDA: Personal Digital Assistant), a game machine, and so on.

This application claims priority based on JP2011-193509, filed with the Japan Patent Office on Sep. 6, 2011, the entire contents of which are incorporated into this specification by reference.

What is claimed is:

1. An image pickup apparatus comprising:
   an image pickup unit that converts an optical image of an object received via an imaging lens into an image signal;
   an exposure control unit capable of controlling an exposure time of the image pickup unit such that the object image is underexposed relative to an appropriate exposure;
   an image processing unit that generates a display image signal by implementing predetermined dynamic range expansion processing on an image signal obtained by performing underexposed image pickup;
   a warning region detection unit that detects an image region in which a pixel within a predetermined gradation range exists as a warning region from the image signal either prior to implementation of the predetermined dynamic range expansion processing or following implementation of the predetermined dynamic range expansion processing;
   a synthesis unit that synthesizes the display image signal generated by the image processing unit with a warning pattern corresponding to the warning region detected by the warning region detection unit; and
   a display unit that displays the image synthesized by the synthesis unit as a live view image,
   wherein the image processing unit performs the predetermined dynamic range expansion processing by performing different gradation conversion processing on each pixel of the image, and
   the warning region detection unit detects a region in which a loss of gradation occurs in accordance with a dynamic range expansion ratio as the warning region in relation to the image signal prior to implementation of the predetermined dynamic range expansion processing.

2. The image pickup apparatus as defined in claim 1, wherein the image processing unit performs the predetermined dynamic range expansion processing by performing identical gradation conversion processing on all pixels of the image, and
   the warning region detection unit detects a region in which a loss of gradation occurs in accordance with a dynamic range expansion ratio as the warning region in relation to the image signal following implementation of the predetermined dynamic range expansion processing.

3. The image pickup apparatus as defined in claim 1, wherein the warning region detection unit detects a plurality of regions in which a loss of gradation occurs in accordance with a plurality of dynamic range expansion ratios as warning regions, and the synthesis unit synthesizes the display image signal generated by the image processing unit with warning patterns corresponding to the plurality of warning regions at a synthesis ratio corresponding to the plurality of warning regions.

4. The image pickup apparatus as defined in claim 1, further comprising a luminance histogram creation unit that creates a luminance histogram corresponding to the warning region detected by the warning region detection unit and a luminance histogram corresponding to an entire region of the display image generated by the image processing unit, wherein the display unit displays an image obtained by superimposing the luminance histogram corresponding to the warning region and the luminance histogram corresponding to the entire region of the display image, created by the luminance histogram creation unit, onto the image synthesized by the synthesis unit as a live view image.

5. The image pickup apparatus as defined in claim 4, wherein the warning region detection unit detects a plurality of regions in which a loss of gradation occurs in accordance with a plurality of dynamic range expansion ratios as warning regions, and the luminance histogram creation unit creates a plurality of luminance histograms corresponding respectively to the plurality of warning regions as luminance histograms corresponding to the warning regions.

6. The image pickup apparatus as defined in claim 5, wherein the display unit displays the plurality of warning regions on the display image in respectively different colors and displays the plurality of luminance histograms corresponding to the plurality of warning regions in identical colors to respective display colors of the warning regions.

7. An image pickup apparatus comprising:

an image pickup unit that converts an optical image of an object received via an imaging lens into an image signal;

an exposure control unit capable of controlling an exposure time of the image pickup unit such that the object image is underexposed relative to an appropriate exposure and capable of controlling the exposure time of the image pickup unit such that the object image is overexposed relative to the appropriate exposure;

a synthesized image generation unit that generates a synthesized image signal by synthesizing an image signal obtained by underexposed image pickup with an image signal obtained by overexposed image pickup;

an image processing unit that generates a display image signal by implementing predetermined dynamic range expansion processing on the synthesized image signal generated by the synthesized image generation unit;

a warning region detection unit that detects an image region in which a pixel within a predetermined gradation range exists as a warning region from the image signal either prior to implementation of the predetermined dynamic range expansion processing or following implementation of the predetermined dynamic range expansion processing;

a synthesis unit that synthesizes the display image signal generated by the image processing unit with a warning pattern corresponding to the warning region detected by the warning region detection unit; and a display unit that displays the image synthesized by the synthesis unit as a live view image, wherein the image processing unit performs the predetermined dynamic range expansion processing by performing different gradation conversion processing on each pixel of the image, and the warning region detection unit detects a region in which a loss of gradation occurs in accordance with a dynamic range expansion ratio as the warning region in relation to the image signal prior to implementation of the predetermined dynamic range expansion processing.

8. The image pickup apparatus as defined in claim 7, wherein the image processing unit performs the predetermined dynamic range expansion processing by performing identical gradation conversion processing on all pixels of the image, and the warning region detection unit detects a region in which a loss of gradation occurs in accordance with a dynamic range expansion ratio as the warning region in relation to the image signal following implementation of the predetermined dynamic range expansion processing.

9. The image pickup apparatus as defined in claim 7, wherein the warning region detection unit detects a plurality of regions in which a loss of gradation occurs in accordance with a plurality of dynamic range expansion ratios as warning regions, and the synthesis unit synthesizes the display image signal generated by the image processing unit with warning patterns corresponding to the plurality of warning regions at a synthesis ratio corresponding to the plurality of warning regions.

10. The image pickup apparatus as defined in claim 7, further comprising a luminance histogram creation unit that creates a luminance histogram corresponding to the warning region detected by the warning region detection unit and a luminance histogram corresponding to an entire region of the display image generated by the image processing unit, wherein the display unit displays an image obtained by superimposing the luminance histogram corresponding to the warning region and the luminance histogram corresponding to the entire region of the display image, created by the luminance histogram creation unit, onto the image synthesized by the synthesis unit as a live view image.

11. The image pickup apparatus as defined in claim 10, wherein the warning region detection unit detects a plurality of regions in which a loss of gradation occurs in accordance with a plurality of dynamic range expansion ratios as warning regions, and the luminance histogram creation unit creates a plurality of luminance histograms corresponding respectively to the plurality of warning regions as luminance histograms corresponding to the warning regions.

12. The image pickup apparatus as defined in claim 11, wherein the display unit displays the plurality of warning regions on the display image in respectively different colors and displays the plurality of luminance histograms corresponding to the plurality of warning regions in identical colors to respective display colors of the warning regions.

13. An image pickup apparatus comprising:

an image pickup unit that converts an optical image of an object received via an imaging lens into an image signal;

an exposure control unit that controls an exposure time of the image pickup unit such that the object image is underexposed relative to an appropriate exposure;

an image processing unit that generates a display image signal by implementing predetermined dynamic range expansion processing on an image signal obtained by performing underexposed image pickup;

a warning region detection unit that detects an image region in which a pixel within a predetermined gradation range exists as a warning region from the image signal either prior to implementation of the predetermined dynamic range expansion processing or following implementation of the predetermined dynamic range expansion processing;

a luminance histogram creation unit that creates a luminance histogram corresponding to the warning region detected by the warning region detection unit and a luminance histogram corresponding to an entire region of the display image generated by the image processing unit;

a superimposing unit that superimposes the luminance histogram corresponding to the warning region and the luminance histogram corresponding to the entire region of the display image, created by the luminance histogram creation unit, onto the display image signal generated by the image processing unit; and a display unit that displays the image on which the luminance histogram corresponding to the warning region and the luminance histogram corresponding to the entire region of the display image have been superimposed by the superimposing unit as a live view image.

14. The image pickup apparatus as defined in claim 13, wherein the image processing unit performs the predetermined dynamic range expansion processing by performing different gradation conversion processing on each pixel of the image, and
the warning region detection unit detects a region in which a loss of gradation occurs in accordance with a dynamic range expansion ratio as the warning region in relation to the image signal prior to implementation of the predetermined dynamic range expansion processing.

15. The image pickup apparatus as defined in claim 13, wherein the image processing unit performs the predetermined dynamic range expansion processing by performing identical gradation conversion processing on all pixels of the image, and
the warning region detection unit detects a region in which a loss of gradation occurs in accordance with a dynamic range expansion ratio as the warning region in relation to the image signal following implementation of the predetermined dynamic range expansion processing.

16. The image pickup apparatus as defined in claim 13, wherein the warning region detection unit detects a plurality of regions in which a loss of gradation occurs in accordance with a plurality of dynamic range expansion ratios as warning regions, and
the luminance histogram creation unit creates a plurality of luminance histograms corresponding respectively to the plurality of warning regions as luminance histograms corresponding to the warning regions.

17. An image pickup apparatus comprising:
an image pickup unit that converts an optical image of an object received via an imaging lens into an image signal;
an exposure control unit capable of controlling an exposure time of the image pickup unit such that the object image is underexposed relative to an appropriate exposure and capable of controlling the exposure time of the image pickup unit such that the object image is overexposed relative to the appropriate exposure;

a synthesized image generation unit that generates a synthesized image signal by synthesizing an image signal obtained by underexposed image pickup with an image signal obtained by overexposed image pickup;

an image processing unit that generates a display image signal by implementing predetermined dynamic range expansion processing on the synthesized image signal generated by the synthesized image generation unit;

a warning region detection unit that detects an image region in which a pixel within a predetermined gradation range exists as a warning region from the image signal either prior to implementation of the predetermined dynamic range expansion processing or following implementation of the predetermined dynamic range expansion processing;

a luminance histogram creation unit that creates a luminance histogram corresponding to the warning region detected by the warning region detection unit and a luminance histogram corresponding to an entire region of the display image generated by the image processing unit;

a superimposing unit that superimposes the luminance histogram corresponding to the warning region and the luminance histogram corresponding to the entire region of the display image, created by the luminance histogram creation unit, onto the display image signal generated by the image processing unit; and a display unit that displays the image on which the luminance histogram corresponding to the warning region and the luminance histogram corresponding to the entire region of the display image have been superimposed by the superimposing unit as a live view image.

18. The image pickup apparatus as defined in claim 17, wherein the image processing unit performs the predetermined dynamic range expansion processing by performing different gradation conversion processing on each pixel of the image, and
the warning region detection unit detects a region in which a loss of gradation occurs in accordance with a dynamic range expansion ratio as the warning region in relation to the image signal prior to implementation of the predetermined dynamic range expansion processing.

19. The image pickup apparatus as defined in claim 17, wherein the image processing unit performs the predetermined dynamic range expansion processing by performing identical gradation conversion processing on all pixels of the image, and
the warning region detection unit detects a region in which a loss of gradation occurs in accordance with a dynamic range expansion ratio as the warning region in relation to the image signal following implementation of the predetermined dynamic range expansion processing.

20. The image pickup apparatus as defined in claim 17, wherein the warning region detection unit detects a plurality of regions in which a loss of gradation occurs in accordance with a plurality of dynamic range expansion ratios as warning regions, and
the luminance histogram creation unit creates a plurality of luminance histograms corresponding respectively to the plurality of warning regions as luminance histograms corresponding to the warning regions.

* * * * *